(12) United States Patent  (10) Patent No.: US 8,818,874 B2
Veseli  (45) Date of Patent: Aug. 26, 2014

(54) SYSTEM AND METHOD TO AUTHENTICATE PRODUCTS

(75) Inventor: Bekim Veseli, Reston, VA (US)

(73) Assignee: Trusted.com, LLC, Reston, VA (US)

( * ) Notice: Subject to any disclaimer, the term of this patent is extended or adjusted under 35 U.S.C. 154(b) by 67 days.

(21) Appl. No.: 12/632,485

(22) Filed: Dec. 7, 2009

(65) Prior Publication Data

US 2010/0145813 A1  Jun. 10, 2010

Related U.S. Application Data

(60) Provisional application No. 61/120,546, filed on Dec. 8, 2008.

(51) Int. Cl.
*G06G 1/12* (2006.01)
*G06Q 20/00* (2012.01)

(52) U.S. Cl.
USPC .................. 705/21; 705/16; 705/18; 705/317

(58) Field of Classification Search
USPC ........................................ 705/21, 16, 18, 317
See application file for complete search history.

(56) References Cited

U.S. PATENT DOCUMENTS

| | | | |
|---|---|---|---|
| 6,223,137 B1 | 4/2001 | McCay et al. | |
| 6,904,410 B1 | 6/2005 | Weiss et al. | |
| 7,222,791 B2 * | 5/2007 | Heilper et al. | 235/462.01 |
| 7,264,169 B2 | 9/2007 | Juds | |
| 2003/0050891 A1 * | 3/2003 | Cohen | 705/42 |
| 2004/0088231 A1 | 5/2004 | Davis, Jr. | |
| 2005/0080677 A1 | 4/2005 | Foss, Jr. | |
| 2006/0004639 A1 * | 1/2006 | O'Keefe, Jr. | 705/26 |
| 2006/0022059 A1 | 2/2006 | Juds | |
| 2007/0106897 A1 * | 5/2007 | Kulakowski | 713/171 |
| 2007/0179978 A1 | 8/2007 | Lee et al. | |
| 2008/0005557 A1 * | 1/2008 | Chester | 713/156 |

FOREIGN PATENT DOCUMENTS

CN  1588410  3/2005

OTHER PUBLICATIONS

International Search Report No. PCT/US2009/067026, dated Jan. 15, 2010, 1 page.
Written Opinion issued in PCT/US2009/067026, dated Jan. 15, 2010.
International Preliminary Report on Patentability issued in PCT/US2009/067026, dated Apr. 6, 2011.
Office Action issued in Chinese Application No. 200980150087.8, dated Jun. 3, 2013.
English language translation of Office Action issued in Chinese Application No. 200980150087.8, dated Jun. 3, 2013.
Chinese Office Action issued in CN 200980150087.8 on Mar. 20, 2014.
English Lanugage Translation of Chinese Office Action issued in CN 200980150087.8 on Mar. 20, 2014.
English Language Abstract of CN 1588410 published Mar. 2, 2005.

* cited by examiner

*Primary Examiner* — F. Zeender
*Assistant Examiner* — Christopher Buchanan
(74) *Attorney, Agent, or Firm* — DLA Piper LLP US

(57) ABSTRACT

A system and method to authenticate products. The method includes storing identity data corresponding to products to be sold into a database, accessing the database at a point-of-sale of a product, and determining the authenticity of the product at the point-of-sale by comparing the product's identity data with the identity data stored in the database.

37 Claims, 2 Drawing Sheets

SYSTEM AND METHOD TO AUTHENTICATE PRODUCTS

CROSS-REFERENCE TO RELATED APPLICATIONS

This application claims the benefit of U.S. Provisional Patent Application Ser. No. 61/120,546, filed on Dec. 8, 2008, the disclosure of which is hereby incorporated by reference in its entirety.

COPYRIGHT NOTIFICATION

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

BACKGROUND OF THE INVENTION

1. Field of the Invention

The present invention relates to a system and method to authenticate products, and more particularly, to a system and method capable of authenticating products from a manufacturer through the chain of commerce up to, including, and beyond a point-of-sale and to maintain a database of the ownership of the products.

2. Description of the Related Art

Counterfeiting branded goods is almost a $1 trillion dollar enterprise annually. The plague of counterfeit goods sold in commerce decreases revenue for the manufacturer of the copied good, or for the athlete or celebrity endorsers of the products sold, etc. The availability of counterfeit products decreases the market value for authentic items since the authenticity of the products is uncertain. Uncertainty about high value products drives down after-market value and limits the resale avenues available to collectors who wish to sell such goods.

The emergence of the Internet as a marketplace has only increased the amount of counterfeit products sold in commerce, and recent court rulings have held Internet sites not responsible for the sale of counterfeit goods. Accordingly, there is a need to provide effective methods to combat counterfeiting, assure buyers that the items they purchased are genuine, and provide assurance to subsequent purchasers that items resold are genuine.

Current solutions to combat counterfeit goods include invisible ink markers, embedded RFID chips, holograms, serial numbers, and certificates of authenticity. However, these approaches all have disadvantages. For example, many of these methods require a unique system of identifying products sold that are themselves eventually counterfeited, and these are not capable of providing independent point-of-sale authentication of products as they are sold.

SUMMARY OF THE INVENTION

The present invention provides a system and method to authenticate a product at a point-of-sale. Further, the present invention provides an authentication platform useful in authentication, product genuineness and title throughout the product's useful life without disrupting manufacturers' current retail practices and processes.

The present invention also provides a platform to track the ownership of a product, and to allow subsequent purchasers of the product to authenticate a purchased product and to update ownership information on the product acquired.

The present invention also provides an open authentication platform capable of using various types of identification data to authenticate the products.

Additional aspects and advantages of the present invention will be set forth in part in the description which follows and, in part, will be obvious from the description, or may be learned by practice of the invention.

The foregoing and/or other aspects and utilities of the present general inventive concept may be achieved by providing a method to authenticate products, the method including registering a product in an authentication platform after manufacture, updating the product's registration in the authentication platform after the product enters commercial distribution, authenticating a product being sold at a point-of-sale, and further updating the product's registration in the authentication platform when the product being sold is certified as authentic.

The registering of the product after manufacture may include collecting identity data corresponding to the product from the manufacturer and inputting the identity data into the authentication platform, and registering the manufacturer as the owner of the product in the authentication platform.

The updating of the product's registration after the product enters commercial distribution may include registering an authorized distributor of the product as the owner of the product in the authentication platform.

The authenticating of the product being sold at the point-of-sale may include comparing identity data of the product being sold to identity data in the authentication platform to determine if the product being sold is authentic.

The product being sold may be certified as authentic when the identity data of the product being sold corresponds to the identity data of the product registered in the authentication platform.

The method may further include issuing a certificate of authenticity at the point-of-sale when the product being sold is certified as authentic.

The certificate of authenticity may include transfer information, and the further updating of the product's registration in the authentication platform when the product being sold is certified as authentic may include registering an authorized purchaser of the product being sold as the owner of the product registered in the authentication platform.

The owner of the product may provide potential buyers access to the product's registration in the authentication platform to confirm ownership of the product.

The owner of the product may provide subsequent owners of the product transfer information, and the method may further include registering a subsequent owner of the product as the owner of the product registered in the authentication platform.

The owner of the product may input status information for the product in the authentication platform, the status information may include at least one of a for sale, not for sale, lost, and stolen status for the product.

The product may be certified as authentic only when the status information of the product is for sale.

The product may not be certified as authentic when the status information of the product is one of not for sale, lost, and stolen.

The foregoing and/or other aspects and utilities of the present general inventive concept may also be achieved by providing a method to authenticate products, the method including storing identity data corresponding to a product in an authentication platform, accessing the authentication platform during an ownership transfer operation for the product, providing identity data for the product during the ownership transfer operation, and determining the authenticity of the product by comparing the product's identity data provided during the ownership transfer operation with the identity data stored in the authentication platform.

The authentication platform may be accessed through a point-of-sale device during the ownership transfer operation, and the ownership transfer operation may include a sale of the product.

The point-of-sale device may issue a certificate of authenticity when the product's identity data provided during the ownership transfer operation corresponds to the identity data stored in the authentication platform.

The method may further include storing ownership information corresponding to the product in the authentication platform.

The method may further include updating the ownership information of the product after the ownership transfer operation.

The certificate of authenticity may include transfer data to allow a purchaser of the product to update the ownership information of the product.

The foregoing and/or other aspects and utilities of the present general inventive concept may also be achieved by providing a system to authenticate retail products, including an authentication platform to register and authenticate products, and a point-of-sale device to access the authentication platform, wherein the authentication platform stores identity data collected from a manufacturer to register the manufacturer as an initial owner of the product in the authentication platform, and the registration of the product may be updated as the product moves through commerce, and wherein the point-of-sale device accesses the authentication platform during a sale operation to authenticate a product being sold by comparing identity data of the product being sold to identity data of the product in the authentication platform to determine if the product being sold is authentic.

The manufacturer may updated the product's registration to register an authorized distributor of the product as the owner of the product in the authentication platform.

The product being sold may be certified as authentic when the identity data of the product being sold corresponds to the identity data of the product registered in the authentication platform.

The point-of-sale device may issue a certificate of authenticity when the product being sold is certified as authentic.

The certificate of authenticity may include transfer information to allow an authorized purchaser of the product being sold to update the registration of the product in the authentication platform to register the authorized purchaser as the owner of the product in the authentication platform.

The owner of the product may provide potential buyers access to the product's registration in the authentication platform to confirm ownership of the product.

The owner of the product may provide subsequent owners of the product transfer information through the authentication platform to register a subsequent owner as the owner of the product in the authentication platform.

The point-of-sale device may be limited to a single retail location.

The point-of-sale device may communicate with the authentication platform through encrypted web service.

The authentication platform may link the product's registration to an online sales or auction website to allow potential buyers to research and verify the product's authenticity before purchasing the product through the online sales or auction website.

The foregoing and/or other aspects and utilities of the present general inventive concept may also be achieved by providing a computer program product stored on tangible computer readable media, the computer program product, when executed by a computer, providing a method to authenticate products, the method including registering a product in an authentication platform after manufacture, updating the product's registration in the authentication platform after the product enters commercial distribution, authenticating a sale of the product at a point-of-sale, and further updating the product's registration in the authentication platform when the product sold at the point-of-sale is certified as authentic.

The authenticating of the sale of the product at the point-of-sale may include comparing identity data of the product sold to identity data in the authentication platform to determine if the product is authentic, and the product sold may be certified as authentic when the identity data of the product sold corresponds to the identity data of the product registered in the authentication platform.

BRIEF DESCRIPTION OF THE DRAWINGS

These and/or other aspects and advantages of the present invention will become apparent and more readily appreciated from the following description of the embodiments, taken in conjunction with the accompanying drawings of which.

DETAILED DESCRIPTION OF THE PREFERRED EMBODIMENT

Figure 1:
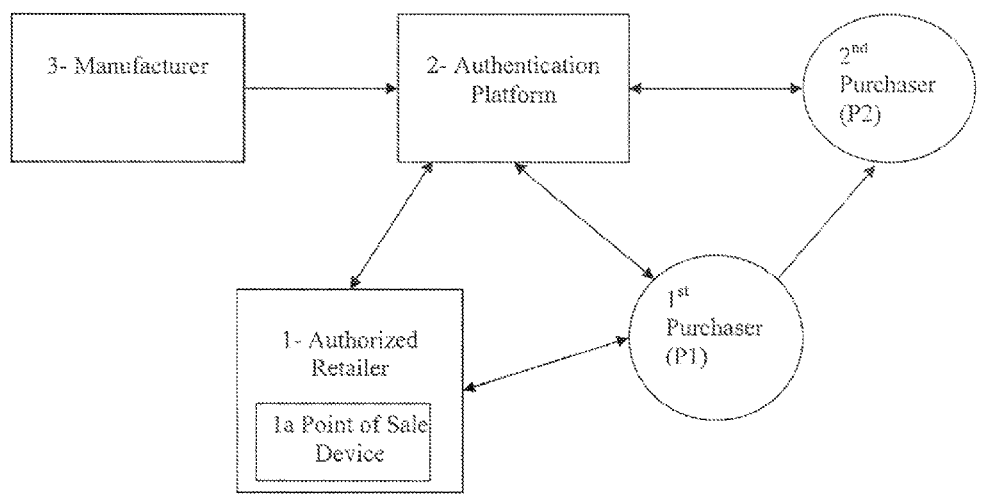
FIG. 1 is a diagram illustrating a system to authenticate a product according to an embodiment of the present invention.

Reference will now be made in detail to embodiments of the present invention, examples of which are illustrated in the accompanying drawings, wherein like reference numerals refer to the like elements throughout. Several of the embodiments are described below in order to explain the present invention by referring to the figures. These embodiments are representative and are in no way intended to limit the potential application of the invention.

FIG. 1 is a diagram illustrating a system to authenticate a product at a point-of-sale. As illustrated in FIG. 1, the system may include an authorized retailer 1, an authentication platform 2, and a manufacturer 3.

The manufacturer 3 provides identification data (ID) for a product to the authentication platform 2, the identification data (ID) can consist of, for example, a serial number associated with the product or any other data or group of data which may be used to uniquely identify a single item. Additional examples of identification data (ID), include but are not limited to 1-dimensional barcodes (1D), 2-dimensional barcodes (2D), Universal Product Code (UPC), Electronic Product Code (EPC), and Item Unique Identification (IUID), all of which can be used to provide identification data (ID) to uniquely identify a product and its associated product information.

The ownership of the product is registered to the manufacturer 3 upon incorporation of the product's identification data (ID) into the authentication platform 2. As the manufacturer 3 introduces the product into the supply chain for distribution, the authentication platform 2 updates the stored identification data to reflect the transfer of ownership and possession of the product to the authorized retailer 1. With the ownership transferred to the authorized retailer 1, the authentication platform 2 updates the product status to reflect the product's availability for sale by the authorized retailer 1.

A first purchaser P1 can purchase the product at the authorized retailer 1. At a time of purchase, the authorized retailer 1 may use a point-of-sale device or website 1a to access the authentication platform 2. The authentication platform 2 compares data corresponding to the product being sold with the stored identification data (ID). The authentication platform 1 may include an electronic database to store information related to the product, for example, the identification data, ownership data, status data, etc. The authentication platform 2 can then supply information regarding the authenticity of the product to the point-of-sale device 1a. For example, the electronic database can be embodied as a centralized component that provides the authentication platform 2 a collection of stored information structured in a way so that it can retrieved, validated, and analyzed, and the information can then be provided to the interacting point-of-sale device and/or website for use by manufacturers, retailers, and individual users. Database management system software can be used for the architecture and functionality of the electronic database and a database server can be used for the electronic storage of the information. A third party can host the electronic database and enforce database security controls such as access controls, encryptions, and auditing in order to protect the stored information.

The point-of-sale device provides an interacting system between the authorized retailer 1 and the authentication platform 2 that allows purchasers a simple and secure method to confirm the authenticity of the product at the time of purchase. The point-of-sale device 1a may include a portable unit to take payment and to access the authentication platform 2. The point-of-sale device 1a can be, for example, an existing pin pad payment device (credit card terminal) at a cash register that has been integrated with the authentication platform 2 through the use of software which provides a multi-solution for payment, verification, and sales registration. The point-of-sale device 2a can be loaded with proprietary software to limit access to the authentication platform to a single retail location with a specific IP address or phone number corresponding to the authorized dealer 1 and/or that particular point-of-sale device 1a. The point-of-sale device 1a can communicate with the database through the use of an encrypted web service that will connect any point of sales terminal with an internet or phone connection to the authentication platform 2, which can be embodied as secured database servers in remote locations.

The authorized retailer 1 can use the point-of-sale device 1a or website to issue a receipt for the sale of the product together with a certificate of genuineness for the product if the product is authenticated. Alternatively, the point-of-sale device 1a can issue a notice that the product sold could not be authenticated.

During the sale of the product, the first purchaser P1 can be registered as the new owner of the product in the authentication platform 2 through the authorized retailer 1 or the authorized retailer 1 can provided transfer information to the first purchaser P1 to allow the first purchaser P1 to register as the new owner with the authentication platform 2. The transfer information can consist of a pin number or other similar information to allow a purchaser to register with the authentication platform 2. For example, a first purchaser P1 can initiate registration at the time of purchase by entering a valid email address and/or other personal information (address, phone, etc.) to create an account with the authentication platform 2 using the point-of-sale device 1a. Alternatively, a first purchaser P1 can also complete a self-registration process and registration of ownership of the product via website access to the authentication platform 2. The website provides the ability to complete transfer of ownership information and register a new user account with a valid email address and/or other personal information (address, phone, etc.). The registration of the user accounts can allow for the identity of the first purchaser P1 to be validated and for the completion of the transfer of ownership of the product from the authorized retailer 1 to the first purchaser P1. The product status can be updated to reflect that the product is no longer available for sale with the completion of the transfer.

The first purchaser P1 can subsequently transfer ownership of the product to a second purchaser P2 in a subsequent after-market sale. For example, P1 can list a product for resale by utilizing a website portion of the authentication platform 2. P1 will be able to link the sale of his/her product on online auction sites, such as EBAY, AMAZON.COM, etc., to the authentication platform 2 to allow potential purchasers to research and verify the product's authenticity before purchasing the product.

The second purchaser P2 can access the authentication platform 2 to authenticate the product. For example, the second purchaser P2 can access a website portion of the authentication platform 2 to enter identity data (ID) for the product. Within the authentication platform 2, the second purchaser P2 can confirm the authenticity of the product, product status as available for resale, and the sellers' ownership of the product.

If the ownership of the product is transferred, P1 can register P2 in the authentication platform 2 or P1 can provide transfer information to P2 such that P2 can itself register with the authentication platform 2. For example, P1 can use the website portion of the authentication platform 2 to update the status of the product to reflect its availability for resale. Once the product status has been updated as available for resale, P1 can complete the transfer ownership form within the authentication platform 2 to processes the ownership transfer to P2. Once ownership has been transferred by P1, P2 can receive email confirmation and then can complete a new user account registration with valid email address and/or other personal information (address, phone, etc.) corresponding to P2 to create an account.

If the first purchaser P1 fails to register with the authentication platform 2 to register an authentic product and then wishes to resell that product, the second purchaser P2 can see a pending confirmation status on the authentication platform 2 when P2 accesses the authentication platform 2 to authenticate the product.

Accordingly, the authentication platform 2 can verify the authenticity of a product sold using the identification data (ID) provided by the manufacturer 3. Additionally, the authentication platform 2 can manage a status of the product. For example, the authentication platform 2 can be accessed to manage a status of the product, for example, to report the product as lost or stolen, transfer ownership of the product, or lock the product against unauthorized sale or transfer.

The identification data (ID) used to authenticate a product can vary according to the manufacturer 3 of the particular product, and the authentication platform 2 can be accessed using different types of identification data (ID) according to the product being authenticated.

Figure 2:
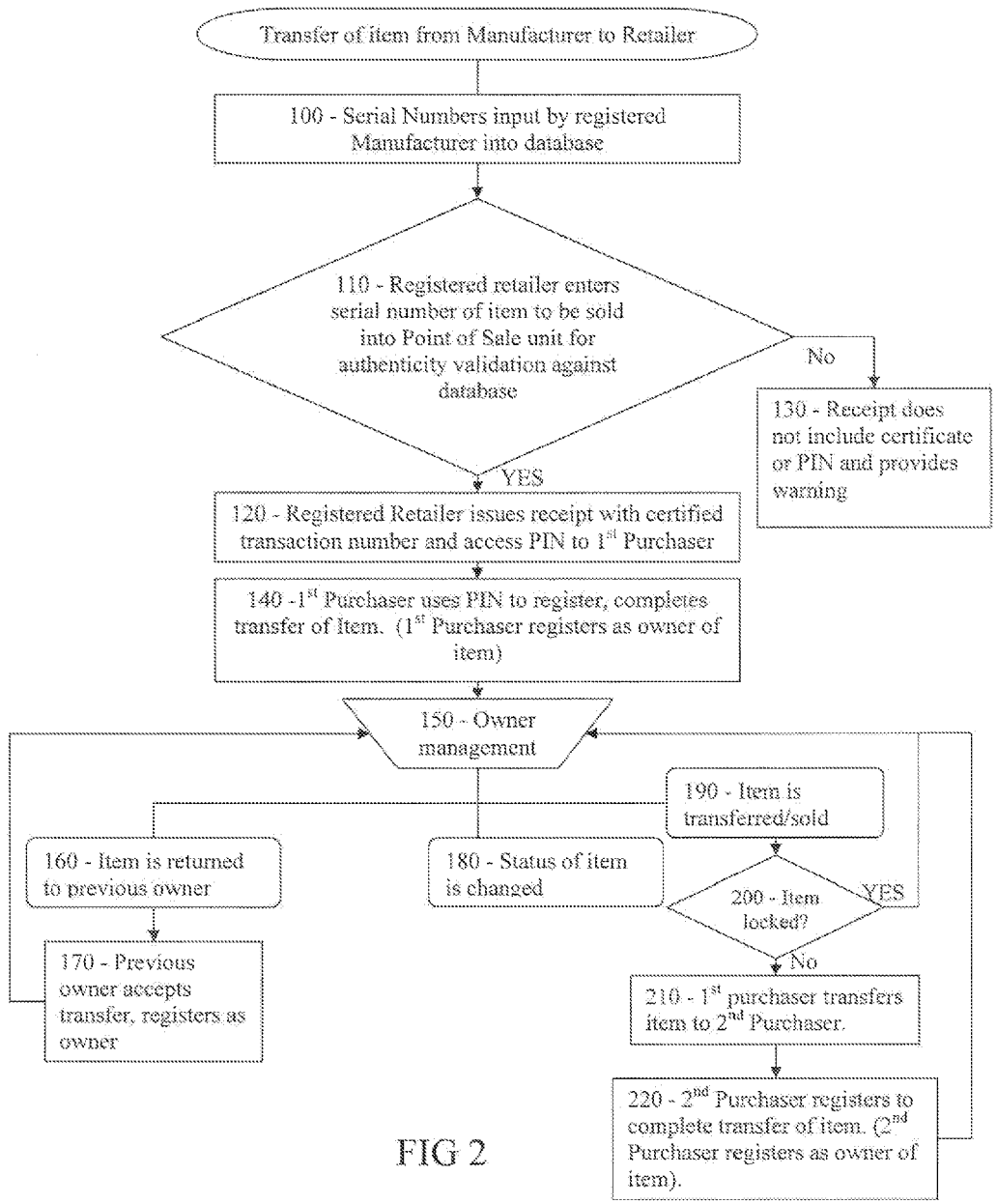
FIG. 2 is a flow chart illustrating a method to authenticate a product according to an embodiment of the present invention.

FIG. 2 is a flow chart illustrating a method to authenticate a product according to an embodiment of the present invention. As illustrated in FIG. 2, identity data for a product is input into a database in operation 100. The identity data may include serial numbers assigned by the manufacturer to the product, and the identity data can be directly input by the manufacturer into the database. In operation 110, an authorized retailer enters identity data for a product being sold into a point-of-sale unit. The point-of-sale unit accesses the database and the authenticity of the product being sold can be verified by comparing the identity data in the database with the identity data input through the point-of-sale unit. The point-of-sale unit can be embodied as a point-of-sale device 1*a* and/or website as described above.

If the authenticity of the product is validated, the authorized retailer can use the point-of-sale unit to issue a receipt including a certificate of authenticity, in operation 120. Further, the certificate of authenticity can include transfer information, such as a pin number, to allow the purchaser of the product to access the database remotely, for example via the Internet, and register as the current owner of the product, as illustrated in operation 140. If the authenticity of the product cannot be validated, the authorized retailer can issue a receipt which does not include a certificate of authenticity or transfer information, and may also include an indication that the authenticity of the product could not be verified in operation 130.

The current owner of the product can access the database to review and/or manage the ownership of the product, in operation 150. The current owner can be the manufacturer, the authorized retailer, or the registered purchaser of the product, and owner management is available during their time of ownership within the process. For example, an authorized manufacturer has owner management rights at the time of product creation, an authorized retailer has owner management rights at the time of product sale, and an individual has owner management rights at the time of purchase.

Under owner management, the current owner of the product can return ownership of the product to a previous owner in operation 160. In operation 170, a previous owner accepts the transfer of ownership and registers as the current owner of the product. In operation 180, the current owner of the product may change the status of the product. For example, the product may be reported lost or stolen, the product may be "locked" against unauthorized sale or transfer, or the current owner may review the chain of custody/ownership of the product.

"Locking" a product protects a product from unauthorized resale and fraudulent sale of replicas of the product with the same serial number or identification data (ID). It also protects the individual from illegally or unknowingly losing possession of the product. A "locked" product removes the product from potential sales transaction and informs other individuals in the marketplace that the product associated with that identification data (ID) is not available for sale and/or possession. The act of "locking" is accomplished by changing the status of an product to a locked state, where it is not available, for resale. This can done through a web based authentication platform 2. A unique pin can be required to perform this action.

The history of transferred ownership of a product can be maintained in the authentication platform 2 and can be available for review by potential buyers. A potential purchaser, such as P2, will be able to see what user(s) owned the product, where the product was purchased, and the length of ownership. Personally Identifiable Information (PII) can be protected from public view.

In operation 190, the current owner of the product can transfer ownership or sell the product. The status of the product is checked in operation 200 to verify that the product is not locked against unauthorized sale or transfer. Products in a locked state are frozen from sale, resale, or transfer of ownership. A locked product's item details may still available for viewing by other users. However, the web based authentication platform 2 may not allow for any transaction processing or owner management actions to be taken against a locked product other than the ability to change a product to an unlocked state. If the product is unlocked, the current owner transfers ownership of the product to a new owner, such as a second purchaser P2, in operation 210. During the transfer operation, the current owner can provide the new owner with transfer information to register as the new owner and access the database. In operation 220, the new owner registers as the current owner.

The embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), and storage media such as carrier waves (e.g., transmission through the Internet). Appendix A, incorporated by reference herein, illustrates an example of a web based version of the authentication platform 2, embodied as a web site.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claims is:

1. A computerized method to authenticate a product, the method comprising:

performing processing using a computer, the processing associated with receiving identity data corresponding to a product only from a manufacturer in an authentication database, the identity data comprising original product information assigned by a manufacturer to the product;

performing processing using the computer, the processing associated with registering the original product information in an authentication server after manufacture of the product;

performing processing using the computer, the processing associated with enabling only certain product information to be updated using the authentication server after the product enters commercial distribution, the certain product information to be updated comprising: information registering an authorized distributor of the product as the owner of the product and information regarding whether the product is for sale or not for sale;

performing processing using the computer, the processing associated with authenticating a product being sold using a point-of-sale device, the authenticating comprising receiving point-of-sale identity data for the product and comparing this point-of-sale identity data to the updated product information to determine whether the product being sold is authentic and available for sale;

performing processing using the computer, the processing associated with enabling further updating of only certain product information in the authentication database when the product being sold is certified as authentic, the certain product information comprising information registering any buyers of the product as the owner of the product in the updated product information; and performing processing, using the computer, the processing associated with enabling authorized potential buyers to view the updated product information in order to understand who has previously owned the product, where the product was purchased, and the length of ownership.

2. The method of claim 1, wherein the performing processing associated with registering of the product after manufacture further comprises:
performing processing, using the computer, the processing associated with collecting identity data corresponding to the product from the manufacturer and performing processing associated with inputting the identity data into the authentication server; and
performing processing, using the computer, the processing associated with registering the manufacturer as the owner of the product in the authentication server.

3. The method of claim 1, wherein the identity data is used to uniquely identify a single item.

4. The method of claim 3, wherein the performing processing associated with authenticating of the product being sold at the point-of-sale comprises:
performing processing using the computer, the processing associated with comparing identity data of the product being sold to identity data in the authentication server to determine if the product being sold is authentic.

5. The method of claim 4, wherein the product being sold is certified as authentic when the identity data of the product being sold corresponds to the identity data of the product registered in the authentication server.

6. The method of claim 5, further comprising performing processing using a computer, the processing associated with issuing a certificate of authenticity using the point-of-sale device when the product being sold is certified as authentic.

7. The method of claim 6, wherein the certificate of authenticity comprises transfer information, and wherein the processing associated with further updating of the product's registration in the authentication server when the product being sold is certified as authentic comprises:
performing processing using a computer, the processing associated with registering an authorized purchaser of the product being sold as the owner of the product registered in the authentication server.

8. The method of claim 7, wherein the owner of the product provides potential buyers access to the product's registration in the authentication server to confirm ownership of the product.

9. The method of claim 7, wherein the owner of the product makes available to subsequent owners of the product transfer information, and the method further comprises:
performing processing using a computer, the processing associated with registering a subsequent owner of the product as the owner of the product registered in the authentication server.

10. The method of claim 9, further comprising performing processing using a computer, the processing associated with inputting status information for the product in the authentication platform, the status information comprising: for sale, not for sale, lost, or stolen, or any combination thereof.

11. The method of claim 10, wherein the product is certified as authentic only when the status information of the product is for sale.

12. The method of claim 10, wherein the product is not certified as authentic when the status information of the product comprises: not for sale, lost, or stolen, or any combination thereof.

13. The method of claim 1, wherein the identity data is a serial number.

14. The method of claim 1, wherein the point-of-sale device is loaded with proprietary software to limit access to the authentication platform to a location with a specific IP address and/or phone number corresponding to the authorized dealer and/or the point-of-sale device.

15. The method of claim 1, wherein the product's registration is linked to an online sales and/or auction website to allow potential buyers to research and/or verify the product's authenticity before purchasing the product through the online sales and/or auction website.

16. The method of claim 1, wherein a complete ownership history of the product is provided.

17. The method of claim 1, wherein a condition of the product is tracked.

18. The method of claim 6, wherein the certificate of authenticity comprises transfer data to allow a purchaser of the product to update the ownership information of the product.

19. A computerized system to authenticate products, comprising:
an authentication server comprising a processor circuit in communication with an authentication database, the authentication server configured for:
performing processing using a computer, the processing associated with receiving identity data corresponding to a product only from a manufacturer, the identity data comprising original product information assigned by a manufacturer to the product;
performing processing using the computer, the processing associated with registering the original product information in an authentication server;
performing processing using the computer, the processing associated with enabling only certain product information to be updated using the authentication server after the product enters commercial distribution, the certain product information to be updated comprising: information registering an authorized distributor of the product as the owner of the product and information regarding whether the product is for sale or not for sale;
performing processing using the computer, the processing associated with authenticating a product being sold using a point-of-sale device, the authenticating comprising receiving point-of-sale identity data for the product and comparing this point-of-sale identity data to the updated product information to determine whether the product being sold is authentic and available for sale;
performing processing using the computer, the processing associated with enabling further updating of only certain product information in the authentication database when the product being sold is certified as authentic, the certain product information comprising information registering any buyers of the product as the owner of the product in the updated product information; and
performing processing, using the computer, the processing associated with enabling authorized potential buyers to view the updated product information in order to understand who has previously owned the product, where the product was purchased, and the length of ownership.

20. The system of claim 19, wherein the processing associated with authenticating of the product being sold at the point-of-sale device comprises:
performing processing using the computer, the processing associated with comparing identity data of the product being sold to identity data in the authentication server to determine if the product being sold is authentic.

21. The system of claim 20, wherein the product being sold is certified as authentic when the identity data of the product being sold corresponds to the identity data of the product registered in the authentication server.

22. The system of claim 21, wherein the point-of-sale device issues a certificate of authenticity when the product being sold is certified as authentic.

23. The system of claim 22, wherein the certificate of authenticity comprises transfer information to allow an authorized purchaser of the product being sold to update the registration of the product in the authentication server to register the authorized purchaser as the owner of the product in the authentication server.

24. The system of claim 23, wherein the owner of the product provides potential buyers access to the product's registration in the authentication server to confirm ownership of the product.

25. The system of claim 24, wherein the owner of the product makes available to subsequent owners of the product transfer information through the authentication server to register a subsequent owner as the owner of the product in the authentication server.

26. The system of claim 19, wherein the processor is further configured for performing processing using the computer, the processing associated with inputting status information for the product in the authentication server, the status information comprising: for sale, not for sale, lost, or stolen, or any combination thereof.

27. The system of claim 26, wherein the product is certified as authentic only when the status information of the product is for sale.

28. The system of claim 24, wherein the authentication server links the product's registration to an online sales and/or auction website to allow potential buyers to research and/or verify the product's authenticity before purchasing the product through the online sales and/or auction website.

29. The method of claim 26, wherein the product is not certified as authentic when the status information comprises: not for sale, lost, or stolen, or any combination thereof.

30. The method of claim 19, wherein the identity data is used to uniquely identify a single item.

31. The method of claim 19, wherein the identity data is a serial number.

32. The method of claim 19, wherein the processing associated with registering of the product after manufacture further comprises:
performing processing using the computer, the processing associated with collecting identity data corresponding to the product from the manufacturer and inputting the identity data into the authentication server; and
performing processing using the computer, the processing associated with registering the manufacturer as the owner of the product in the authentication server.

33. The method of claim 19, wherein the point-of-sale device is loaded with proprietary software to limit access to the authentication server to a location with a specific IP address and/or phone number corresponding to the authorized dealer and/or the point-of-sale device.

34. The method of claim 19, wherein the product's registration is linked to an online sales and/or auction website to allow potential buyers to research and/or verify the product's authenticity before purchasing the product through the online sales and/or auction website.

35. The method of claim 19, wherein a complete ownership history of the product is provided.

36. The method of claim 19, wherein a condition of the product is tracked.

37. The method of claim 22, wherein the certificate of authenticity comprises transfer data to allow a purchaser of the product to update the ownership information of the product.

* * * * *